US011566697B2

(12) United States Patent
Palmer et al.

(10) Patent No.: US 11,566,697 B2
(45) Date of Patent: Jan. 31, 2023

(54) DRIVE SPROCKET

(71) Applicant: NEW MOTION LABS LTD., Exeter Devon (GB)

(72) Inventors: Josh Daniel Palmer, London (GB); Lucas Lobmeyer, Loehnberg (DE); Marcel Fowler, London (GB)

(73) Assignee: NEW MOTION LABS LTD., Exeter Devon (GB)

( * ) Notice: Subject to any disclaimer, the term of this patent is extended or adjusted under 35 U.S.C. 154(b) by 186 days.

(21) Appl. No.: 17/178,747

(22) Filed: Feb. 18, 2021

(65) Prior Publication Data

US 2021/0180677 A1 Jun. 17, 2021

Related U.S. Application Data

(63) Continuation-in-part of application No. 16/629,918, filed as application No. PCT/GB2018/000105 on Jul. 10, 2018, now Pat. No. 11,421,756.

(30) Foreign Application Priority Data

Jul. 13, 2017 (GB) ..................................... 1711342
Sep. 28, 2017 (GB) ..................................... 1715782
Oct. 24, 2017 (GB) ..................................... 1717436

(51) Int. Cl.
*F16H 55/30* (2006.01)
*F16G 13/02* (2006.01)
(Continued)

(52) U.S. Cl.
CPC ............. *F16H 55/30* (2013.01); *F16G 13/02* (2013.01); *F16H 7/06* (2013.01); *F16H 55/08* (2013.01)

(58) Field of Classification Search
CPC . F16H 55/30; F16H 55/08; F16H 7/06; F16G 13/02
(Continued)

(56) References Cited

U.S. PATENT DOCUMENTS 4,290,762 A 9/1981 Lapeyre
4,378,719 A 4/1983 Burgess
(Continued)

FOREIGN PATENT DOCUMENTS

CN 102537210 7/2012
DE 102014206896 10/2014
(Continued)

OTHER PUBLICATIONS

Chinese Search Report, Chinese Application No. 201880046123.5.
(Continued)

*Primary Examiner* — Gene O Crawford
*Assistant Examiner* — Emily R Kincaid
(74) *Attorney, Agent, or Firm* — Saliwanchik, Lloyd & Eisenschenk

(57) ABSTRACT

A drive sprocket can include a plurality of teeth for meshing with a drive member to transmit rotary motion. The drive member can include a plurality of engagement pockets engaging the teeth of the drive sprocket, where each tooth has a tooth profile defined by a first side comprising a first engagement surface and an opposite second side comprising a second engagement surface, which engagement surfaces are configured such that when driven, a tooth meshes to the engagement pocket at a first contact location on the first engagement surface and also at a second contact location on the second engagement surface.

10 Claims, 5 Drawing Sheets

(51) Int. Cl.
*F16H 7/06* (2006.01)
*F16H 55/08* (2006.01)

(58) Field of Classification Search
USPC .......................................................... 474/148
See application file for complete search history.

(56) References Cited

U.S. PATENT DOCUMENTS

| | | |
|---|---|---|
| 6,526,740 B1 | 3/2003 | Tanemoto et al. |
| 2004/0185977 A1 | 9/2004 | Young et al. |
| 2008/0176688 A1 | 7/2008 | Sakura et al. |
| 2013/0225345 A1 | 8/2013 | Bodensteiner et al. |
| 2014/0057750 A1 | 2/2014 | Yokoyama |
| 2014/0141913 A1 | 5/2014 | Yokoyama |
| 2016/0348755 A1 | 12/2016 | Ritz et al. |

FOREIGN PATENT DOCUMENTS

| | | |
|---|---|---|
| EP | 0171561 | 2/1986 |
| GB | 2351543 | 1/2001 |
| JP | 3501493 | 3/2004 |

OTHER PUBLICATIONS

Intellectual Property Office, Search Report, GB Application No. 1717436.8, dated Jan. 5, 2018.
International Search Report dated Oct. 24, 2018 for PCT/GB2018/000105.

DRIVE SPROCKET

CROSS-REFERENCE TO RELATED APPLICATIONS

This application is a continuation-in-part (CIP) application of U.S. patent application Ser. No. 16/629,918, filed Jan. 9, 2020, which is a national stage application of International Patent Application No. PCT/GB2018/000105, filed Jul. 10, 2018, which claims priority to Great Britain Application No. 1711342.4, filed Jul. 13, 2017, Great Britain Application No. 1715782.7, filed Sep. 28, 2017, and Great Britain Application No. 1717436.8, filed Oct. 24, 2017, the disclosures of all of which are incorporated herein by reference in their entirety, including any figures, tables, and drawings.

BACKGROUND TO THE INVENTION

This invention relates to a drive sprocket, and particularly, but not exclusively, to a drive sprocket for use with a drive member, wherein the drive sprocket comprises a plurality of teeth. The invention also relates to a transmission system comprising a drive sprocket and a drive member, and a drive member forming part of a transmission system.

Drive sprockets, or pulleys, having a plurality of teeth for use with drive members such as power transmission chains or belts are well known, and often take the form of a substantially circular sprocket having a plurality of teeth spaced apart around an outer circumference of the sprocket.

A variety of different drive members may be used with such drive sprockets.

A first type of known drive member is a power transmission chain in the form of a roller chain. The roller chain has a plurality of engaging formations for enabling engagement with the drive sprocket. The engaging formations are in the form of receiving formations, for receiving the teeth of the drive sprocket. An example of a use of a roller chain is for a bicycle. The roller chain for a bicycle passes around a front drive sprocket in the form of a chainring, and it also passes around a rear drive sprocket in the form of a gear wheel. The known roller chains are also able to be used in many other different types of apparatus including, for example, tricycles, motorcycles and chain saws.

A second type of known drive member is a power transmission chain comprising a silent chain. The silent chain also has a plurality of engaging formations for enabling engagement with the drive sprocket. The engaging formations are in the form of tooth formations for being received in receiving recesses formed between adjacent teeth on the drive sprocket. The silent chain is used for high torque applications which need high efficiency and the transfer of a lot of power.

Typical of such applications is the use of a silent chain as a timing chain for engines. The silent chain is also often referred to as a HY-VO chain.

A third type of know drive member is a belt which is adapted to engage with the teeth of a pulley.

As is well known, a drive member enables transmission of power between drive sprockets. Known drive sprockets may drive the drive member as in the case of a chainring on a bicycle, or the drive sprockets may be driven by the drive member as in the case of rear gear drive sprockets on a bicycle.

It is known that power transmission chains are formed by chain links which are pivotally connected together by pivots which extend transversely completely across the chain link.

The known drive members and known drive sprockets do not transmit power as efficiently as would be desired. More specifically, the known drive members invariably make contact with the drive sprockets under significant loads, and in such situations, the drive members frequently tend to move relative to the teeth of the sprocket whilst maintaining contact under this high loading. The result is that the known power transmission chains do not work efficiently on the drive sprockets.

SUMMARY OF THE INVENTION

According to a first aspect of the invention there is provided a drive sprocket comprising a plurality of teeth for meshing with a drive member to transmit rotary motion, the drive member including a plurality of engagement pockets engaging the teeth of the drive sprocket, wherein each tooth has a tooth profile defined by a first side comprising a first engagement surface and an opposite second side comprising a second engagement surface, which engagement surfaces are configured such that when driven, a tooth meshes to the engagement pocket at a first contact location on the first engagement surface and also at a second contact location on the second engagement surface, the first contact location being radially offset from the second contact location, and wherein each tooth has a front face and a back face, the shape of which faces being defined by the first and second sides such that the shape of each face is symmetrical about a radial axis of the tooth, and the first side of each face is defined at least partially by a first face arc, and the second side of each face is defined at least partially by a second face arc, wherein the distance between the centre of the first face arc and the centre of the second face arc of each tooth is substantially the same as the distance between the centre of the first face arc of a first tooth and the centre of the second face arc of an adjacent tooth.

By means of the present invention therefore a drive sprocket is provided in which not only is each tooth symmetrical, and all teeth are shaped substantially the same, but the distance between adjacent teeth is defined by the radius of an arc forming the first face arc and the second face arc.

In some embodiments of the invention the first face arc forms a base portion of the first side of each tooth, and the second face arc forms a base portion of the second side of each tooth, wherein the first and second face arcs each comprise a roller seating curve.

In such embodiments of the invention the roller seating curve is adapted to receive a roller or other engaging part of the drive member which is adapted to mesh with the sprocket.

In some embodiments of the invention each first and second side comprises a second portion comprising a convex arc extending from a respective roller seating curve towards a tip portion of a respective tooth.

In such embodiments of the invention, the second portion comprising a convex arc may comprise a working curve. The convex arc shape of the working curve allows the drive member to articulate during engagement and disengagement without making contact with a tooth of the sprocket.

The drive sprocket may further comprise a supporting curve extending from the roller seating curve of a first tooth towards the roller seating curve of an adjacent tooth.

In such embodiments of the invention, the supporting curve is adapted to receive a roller or other member of the drive member to support the roller or other member.

According to a second aspect of the invention there is provided a transmission system comprising a drive sprocket according to embodiments of the first aspect of the invention, and further comprising a drive member, which drive member is adapted to mesh with the drive sprocket.

In embodiments of the invention the drive member comprises a plurality of engagement pockets, each of which engagement pockets comprising a first engaging surface and a second engaging surface spaced apart from the first engaging surface.

In embodiments of the invention, the drive member comprises a roller chain and the engagement pockets are defined between adjacent rollers forming the roller chain.

An engaging pocket of a drive member is considered to be a pair of parallel cylindrical rollers at a fixed distance from one another, forming a space in which the teeth of the drive member are adapted to sit.

In embodiments of the invention where the drive member comprises a roller chain, an engagement pocket is defined between adjacent rollers of the roller chain.

When an engagement pocket is engaged with a tooth, it has a single degree of freedom only. This is the articulation of the engagement pocket about the centre of the respective roller.

In embodiments of the invention, the roller chain has a pitch p, and the distance between the centre of the first face arc and the centre of the second face arc of each tooth, and the distance between the centre of the first face arc of a first tooth and the centre of the second face arc of an adjacent tooth is substantially equal top.

In embodiments of the invention, two rollers will be positioned between adjacent teeth of the sprocket to form an engagement pair. This means that every other engagement pocket will engage with a tooth of the sprocket because only every other pair of rollers will be positioned around a tooth to form an engagement pair of rollers. The remaining pairs of rollers will be positioned between adjacent teeth of the sprocket and so the engagement pockets of these roller pairs will not be in contact with a tooth.

This is advantageous since only half of the rollers will be load bearing during articulation of the drive member on the sprocket. The other half will be supporting and will therefore have reduced contact load during their articulation. This in turn decreases some of the transmission system wear and frictional losses leading to higher transmission efficiency.

This is in sharp contrast to known sprockets for use with roller chain drive members where each roller is positioned between two adjacent teeth during use of the sprocket.

In embodiments of the invention where the drive member is a roller chain, the radius of each roller is substantially equal to, or slightly smaller than, the radius of each seating curve.

By means of the present invention, the rollers of the roller chain will be supported by the roller seating curve in such a way that the engagement pocket defined between adjacent rollers of the drive member will mesh with the tooth such that the engagement pocket meshes at two contact locations.

Due to the dimensions of the arc defining the roller seating curve, and due to the radius of each roller relative to that arc, during use of the transmission system, the roller chain will engage such that two rollers are positioned between adjacent teeth.

In addition, the radius of the first face arc and second face arc remains substantially the same regardless of the number of teeth on the sprocket.

This simplifies the production process of the sprocket.

In embodiments of the invention, during use of the transmission system, a first roller or other drive member engaging part, will be a load bearing roller or part, and a second roller or drive member part will serve as a supporting roller or part. When a roller or other engaging part is acting as a support it may be supported and received by the roller seating curve.

BRIEF DESCRIPTION OF THE DRAWINGS

The invention will now be further described by way of example only with reference to the accompanying drawings in which.

DETAILED DESCRIPTION

Figure 1:
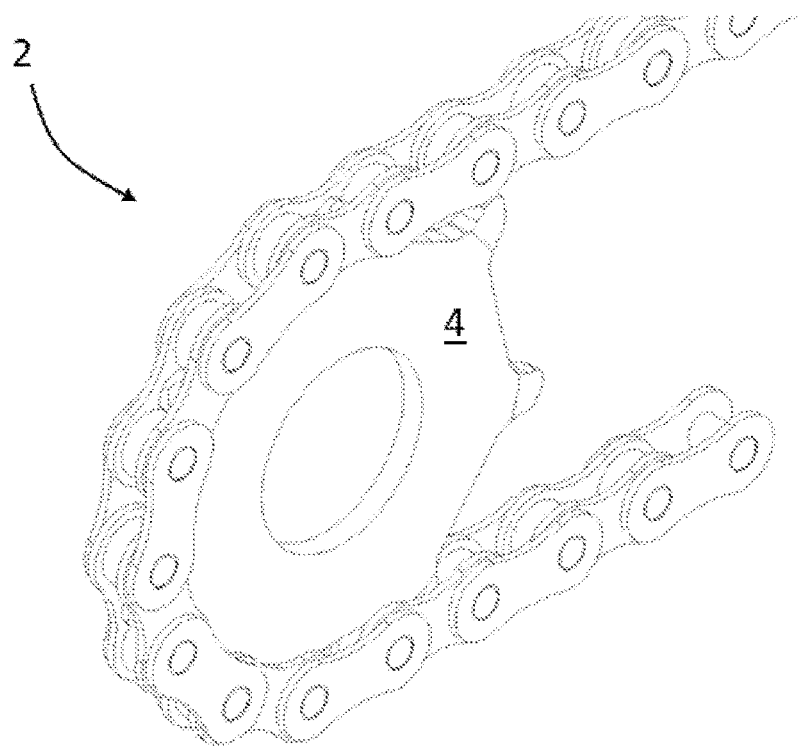
FIG. 1 is a schematic representation of a roller chain engaged with a sprocket according to the first aspect of the invention and forming a transmission system according to an embodiment of the second aspect of the invention.
Figure 2:
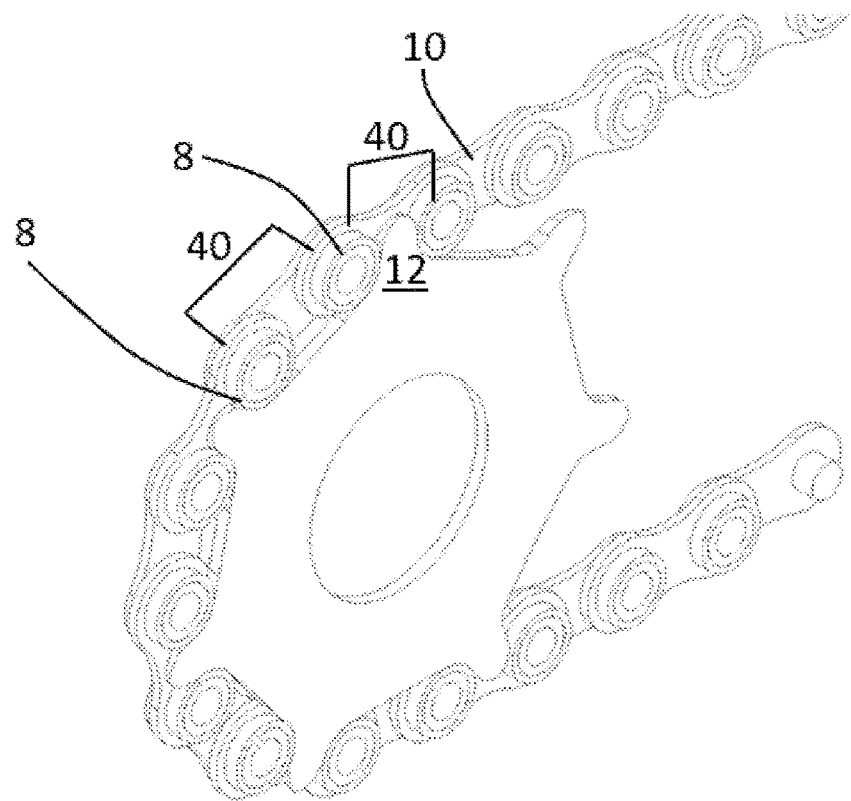
FIG. 2 is a schematic representation of the transmission system of FIG. 1 with some links removed to show more clearly how the rollers of the chain engage with the sprocket.

Referring initially to FIGS. 1 and 2 a transmission system according to an embodiment of the invention is designated generally by the reference numeral 2. The transmission system comprises a sprocket 4 and a drive member comprising a roller chain 6.

In this embodiment of the invention the roller chain 6 is a standard roller chain comprising a plurality of rollers 8 which extend transversely across the transmission member and are spaced apart along the length of the drive member to form the chain. The rollers are connected to one another by links 10 in a known manner. The roller chain 6 is able to articulate between adjacent rollers 8. An engagement pocket 40 is defined between adjacent rollers 8. Each engagement pocket 40 is adapted to engage with a tooth 12 as will be described in more detail below.

By means of the present invention, however, only every other engagement pocket 40 will engage with a tooth during use of the transmission system 2. The remaining every other engagement pockets 40 will effectively engage with the space between adjacent teeth 12.

Figure 3:
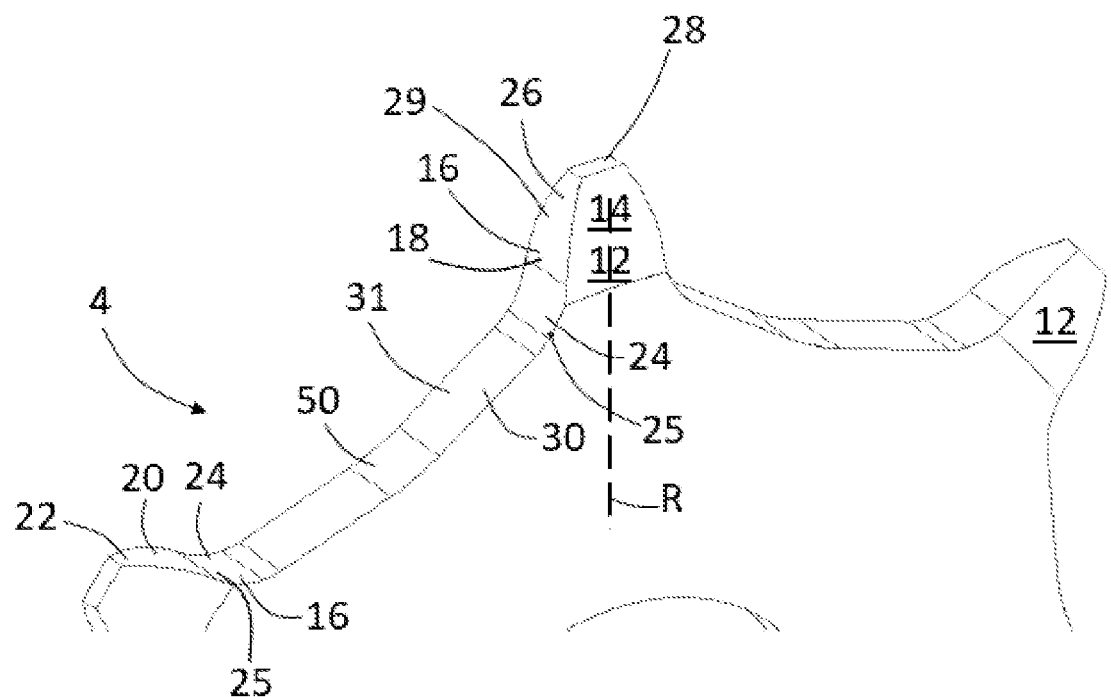
FIG. 3 is a perspective view of part of the sprocket of FIG. 1 showing the tooth profile of the teeth of the sprocket.

Turning now to FIG. 3, the sprocket 4 is shown in more detail.

The sprocket 4 comprises a plurality of teeth 12 which are all shaped substantially identically to one another. Each tooth has a tooth face or profile 14 which is symmetrical about a radial axis R of the sprocket 4.

The tooth profile 14 is defined by a first side 16 comprising a first engagement surface 18, and a second side 20 defining a second engagement surface 22. Each of the first and second sides 16,20 comprises a base portion 24 which forms a roller seating curve 25. Each side further comprises a portion 26 extending from the roller seating curve towards a tip 28 of the tooth. The portion 26 is convex and defines a working curve 29.

The sprocket 4 comprises a further curve 30 forming a supporting curve 31 which extends between adjacent teeth.

Figure 4:
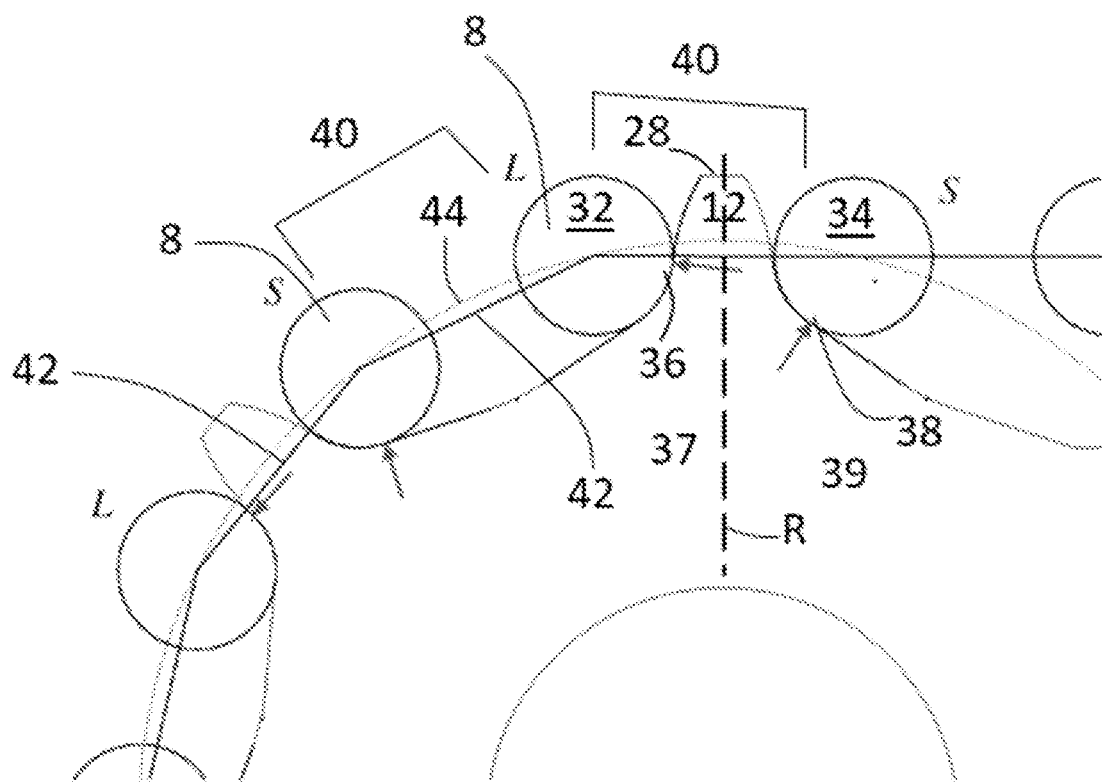
FIG. 4 is a schematic representation of the transmission system of FIG. 1 showing how the rollers of the roller chain engage with the teeth of the sprocket.
Figure 5:
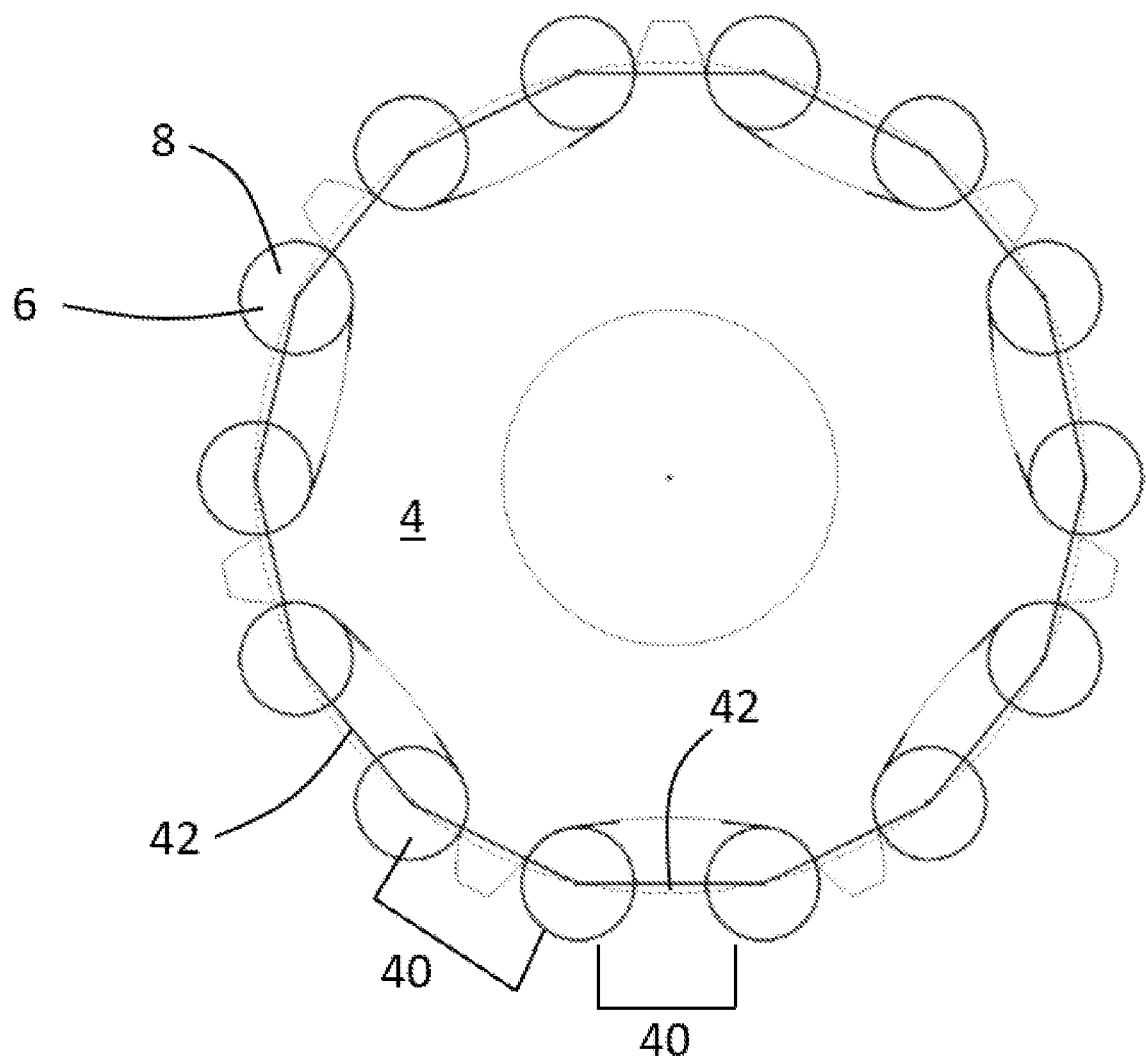
FIG. 5 is a schematic representation of the transmission system of FIG. 1 showing where the engagement pockets lie during use of the transmission system.

As shown in FIGS. 4 and 5 particularly, in use of the transmission system 2, every other engagement pocket 40 will engage with a respective tooth 12 whilst the remaining every other engagement pocket 40 will not engage a tooth. This is because, due to the dimensions of the sprocket, and particularly the profile of the tooth, relative to the dimensions of the rollers 8, when the roller chain 6 is engaged with the sprocket 4 there will be two rollers 8 positioned between adjacent teeth. This in turn means that every other engagement pocket 40 will engage with a tooth 12, with every other engagement pocket effectively engaging with spaces between adjacent teeth 12 of the sprocket.

Referring to FIG. 4 the manner in which the rollers 8 engage with the sprocket 4 during use of the transmission system 2 is shown schematically.

When considering a pair of rollers 8 positioned on either side of a tooth 12, one roller 32 will be a load bearing roller, and the second roller 8 will be a supporting roller 34.

The roller seating curve 25 provides an initial seating position for the engaged rollers 8 of the roller chain 6. For both load bearing and supporting rollers, this curve helps to distribute the contact load over a larger area reducing material stresses, at least initially when the chain wear is low. The roller seating curve 25 enables rollers to easily transition between supporting and load bearing positions if the drive direction is ever reversed.

The load bearing roller 32 will engage with the tooth 12 on a first engagement surface 36, and the support roller 34 will engage with the tooth at a second engagement surface 38.

The first and second engagement surfaces 36,38 are radially offset from one another. This enables the pair of rollers 8 engaging the tooth 12 to engage with dual engagement, since the roller chain makes contact with the sprocket teeth 12 at two contact points 37, 39 on engagement surfaces 36, 38 in each tooth of the sprocket.

The two contact points 37, 39 are thus on opposing sides of the tooth relative to its radial centreline R, and are radially offset from one another and therefore not symmetric relative to the radial centreline R.

The combination of these features leads to a secure engagement of the drive sprocket tooth by the roller chain 6 and ensures that the rollers 8 do not become wedged on the tooth. In addition, there is little to no relative movement between the tooth and the rollers 8 whilst in contact.

The first contact point 37 is load bearing and transfers the load between the roller chain 6 and the tooth 12. The second contact point 39 is supporting and thus stabilises the roller chain 6 on the sprocket 4 and increases the load distribution over the sprocket teeth 12.

As shown in FIGS. 3 and 4, each tooth 12 further comprises a working curve 26 that extends from the roller seating curve towards the tip 28 of the tooth.

Figure 8:
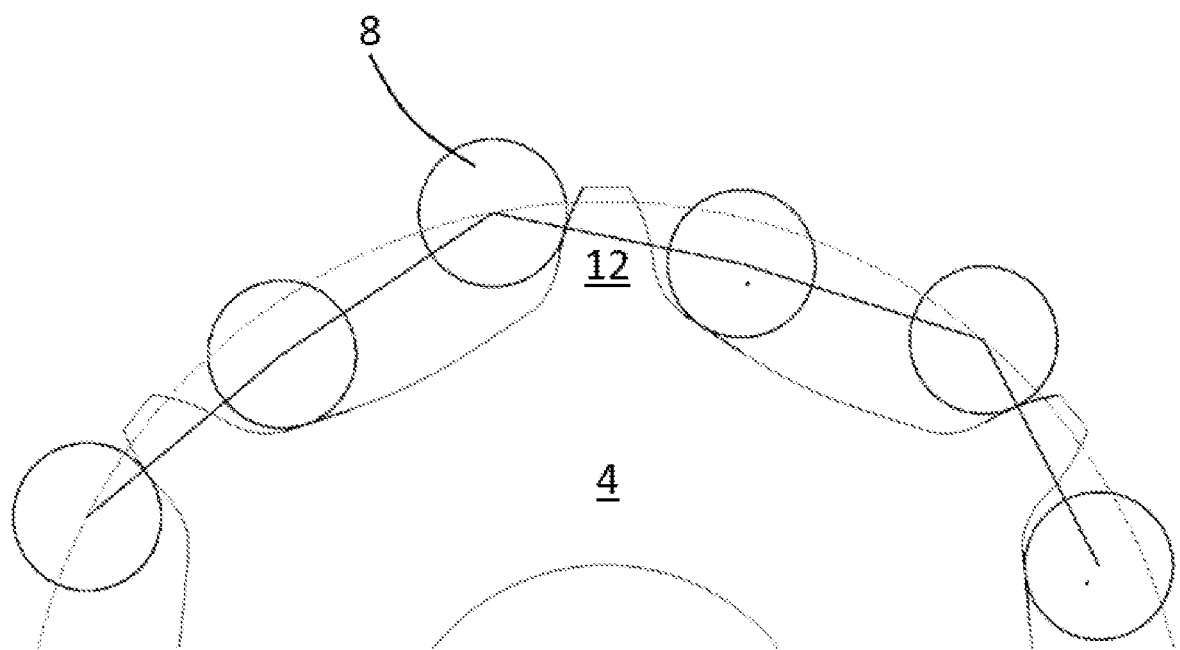
FIG. 8 is a schematic representation showing movement of the rollers caused by wear of the drive member shown in FIG. 1.

The working curve 26 is convex, and the convex arc forming the working curve 26 curves towards the tooth centreline R. The surface of working curve 26 makes contact with the load bearing roller 32, enabling torque transfer between the roller chain 6 and the sprocket 4. As the chain pitch elongates due to internal wear, this surface also accommodates the climbing of the load-bearing roller as shown in FIG. 8.

The tip 28 of each tooth does not need to have a pointed profile. This is because when an engagement pocket 40 is at the point of engagement with the tooth 12 it has a single degree of freedom only which is the articulation of the engagement pocket about the centre of the roller.

The working curve is the primary load bearing contact surface situated on an upper portion of the sides of each tooth. It is this surface that makes contact with the load bearing roller 32, enabling torque transfer between chain and sprocket. As the chain pitch elongates due to internal wear, this surface also accommodates the climbing of the load bearing roller ensuring that the sprocket is able to transfer load through the entire lifetime of the chain.

Turning again to FIG. 3, the sprocket further comprises a supporting curve 50 which extends between the roller seating curves of adjacent teeth.

The supporting curve is designed to accommodate the supporting roller 34. The supporting curve may also accommodate some movement of the supporting roller 34 over the lifetime of the roller chain 6, as the worn chain adopts an altered position on the sprocket.

Referring specifically to FIGS. 4 and 5, the engaging pockets 40 are represented by lines 42.

The line 42 of each engagement pocket sits with endpoints situated on a circle 44 known as the pitch circle. The pitch circle defines the centre point of all the roller seating curves 25.

In this embodiment of the invention the radius of each roller seating curve is slightly larger than the radius of each roller. This results in the engagement pockets 40 sitting marginally off the pitch circle 44. This in turn ensures that the rollers adopt their respective load bearing and supporting positions and prevents the engagement pockets from getting stuck on the teeth.

Figure 6:
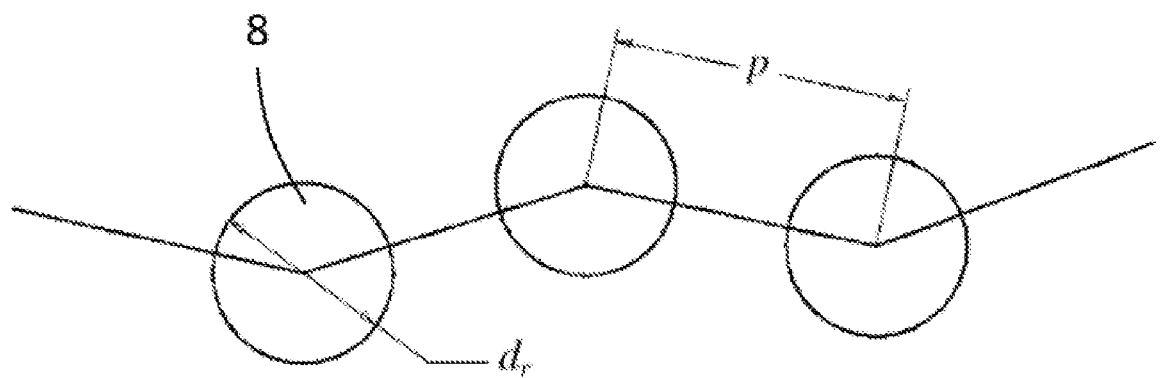
FIG. 6 is a schematic representation showing the dimensions of the rollers of the roller chain shown in FIG. 1.

Referring to FIG. 6, the dimensions of the roller chain 6 are shown in more detail.

As can be seen from FIG. 6, the distance between adjacent rollers, known as the chain pitch, may be represented by the letter p, and the diameter of each roller may be represented by $d_r$.

Figure 7:
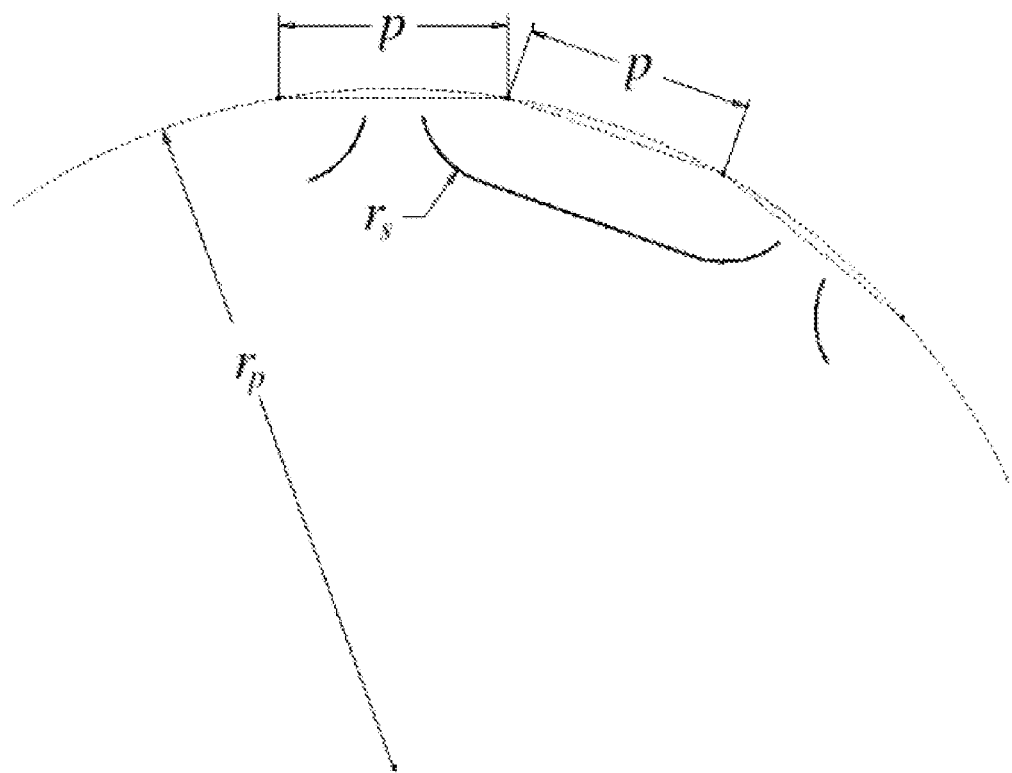
FIG. 7 is a schematic representation of the sprocket arc construction of the transmission system shown in FIG. 1.

Referring now to FIG. 7, a schematic representation of part of the transmission system 2 of FIG. 1 is shown. The circle radius $r_p$ represents the pitch circle. This is the circle which passes through all of vertices of a regular polygon of n sides, for a sprocket 4 which has n/2 teeth. Each side of the regular polygon has a length ρ. FIG. 7 shows three of the sides of the regular polygon showing the length as ρ.

The radius of the arc forming the first face arc and the second face arc may be represented by $r_s$. The centre of a roller seating curve 25 with radius $r_s$ sits at each vertex of the regular polygon forming the bases of the teeth. The radius of the arc may be compared with the radius of the roller and given as a ratio ρ. In addition, the steepness of the working curve relative to the centreline of the tooth at the contact point of the load bearing roller 32 may be denoted by Θ. In embodiments of the invention, the ratio ρ was found to be 1.01 regardless of the number of teeth on the sprocket 12.

Θ was found to vary depending on the number of teeth forming the sprocket.

A representative, but non-exhaustive list of values for Θ is set out below:

| Number of teeth in the sprocket | Theta (degrees) |
| --- | --- |
| 6 | 0.3 |
| 8 | 2.3 |
| 10 | 2.7 |
| 25 | 5.4 |
| 30 | 4.5 |
| 32 | 4.2 |

Thus, it can be seen that in a transmission system according to an embodiment of the invention, the teeth 12 of the sprocket 4 will have a profile that hardly varies depending on the number of teeth forming the sprocket.

By means of the embodiments of the invention therefore a standard roller chain, for example a roller chain meeting the ISO 606 standard, is able to engage a sprocket such that dual engagement is achieved.

In embodiments of the invention where the sprocket 4 has n teeth, the roller seating arc has a fixed radius $r_s$ for all n, and this radius is slightly larger than the radius of each roller 8.

What is claimed is:

1. A drive sprocket comprising a plurality of teeth for meshing with a drive member to transmit rotary motion, the drive member including a plurality of engagement pockets engaging the teeth of the drive sprocket, wherein each tooth has a tooth profile defined by a first side comprising a first engagement surface and an opposite second side comprising a second engagement surface, which engagement surfaces are configured such that when driven, a tooth meshes to the engagement pocket at a first contact location on the first engagement surface and also at a second contact location on the second engagement surface, the first contact location being radially offset from the second contact location, and wherein each tooth has a front face and a back face, the shape of which faces being defined by the first and second sides such that the shape of each face is symmetrical about a radial axis of the tooth, and the first side of each face is defined at least partially by a first face arc, and the second side of each face is defined at least partially by a second face arc, wherein the distance between the centre of the first face arc and the centre of the second face arc of each tooth is substantially the same as the distance between the centre of the first face arc of a first tooth and the centre of the second face arc of an adjacent tooth.

2. A drive sprocket as claimed in claim 1, wherein the first face arc of each tooth comprises a base portion of the first side of the said tooth, and the second face arc of each tooth forms a base portion of the second side of the respective tooth, wherein the first and second face arcs each comprise a roller seating curve.

3. A drive sprocket as claimed in claim 1, wherein each first and second side comprises a second portion comprising a convex arc extending from a respective roller seating curve towards a tip portion of a respective tooth.

4. A drive sprocket as claimed in claim 1, further comprising a supporting curve extending from the roller seating curve of a first tooth towards the roller seating curve of an adjacent tooth.

5. A transmission system comprising a drive sprocket according to claim 1, the transmission system further comprising a drive member, which drive member is adapted to mesh with the drive sprocket.

6. A transmission system as claimed in claim 5, wherein the drive member comprises a plurality of engagement pockets, each of which engagement pockets comprising a first engaging surface and a second engaging surface spaced apart from the first engaging surface.

7. A transmission system as claimed in claim 6, wherein the drive member comprises a roller chain, and wherein the engagement pockets are defined between adjacent rollers forming the roller chain.

8. A transmission system as claimed in claim 7, wherein the roller chain has a pitch p, and the distance between the centre of the first face arc and the centre of the second face arc of each tooth, and the distance between the centre of the first face arc of a first tooth and the centre of the second face arc of an adjacent tooth is substantially equal to p.

9. A transmission system as claimed in claim 7, wherein the radius of each roller forming the roller chain is substantially equal to, or slightly smaller than, the radius of each arc forming the first and second faced arcs.

10. A drive member forming part of a transmission system as claimed in claim 5.

* * * * *